(12) United States Patent
Noel

(10) Patent No.: US 6,383,540 B1
(45) Date of Patent: May 7, 2002

(54) METHOD OF PROCESSING WHEY FOR DEMINERALIZATION PURPOSES

(75) Inventor: Roland Noel, L'Union (FR)

(73) Assignee: Eurodia Industrie S.A., Wissous (FR)

( * ) Notice: Subject to any disclaimer, the term of this patent is extended or adjusted under 35 U.S.C. 154(b) by 0 days.

(21) Appl. No.: 09/563,332

(22) Filed: May 3, 2000

(30) Foreign Application Priority Data

May 17, 1999 (FR) .............................................. 99 06217

(51) Int. Cl.$^7$ .............................................. A23C 21/00
(52) U.S. Cl. ........................ 426/271; 426/583; 210/650; 210/651; 210/663; 210/669; 210/677; 127/46.3; 127/54.55; 127/462
(58) Field of Search ................................ 426/271, 583; 210/650, 651, 663, 669, 677; 127/462, 46.3, 54.55

(56) References Cited

U.S. PATENT DOCUMENTS 3,618,589 A * 11/1971 Tavani .......................... 210/30
4,803,089 A * 2/1989 Chaveron et al. ............ 426/271
5,376,393 A * 12/1994 Nardelli et al. .............. 426/271

FOREIGN PATENT DOCUMENTS

| EP | A1835610 | 4/1998 |
| WO | 99-04903 | * 4/1999 |

OTHER PUBLICATIONS

Guengerich et al, Bulletin Federation Internationale De Laiterie, vol. 311, pp. 11–13 (1996).
Berghofer et al, Milchwissenschaft, vol. 41, No. 11, pp. 700–703 (1996).

* cited by examiner

Primary Examiner—Helen Pratt
(74) Attorney, Agent, or Firm—Birch, Stewart, Kolasch & Birch, LLP

(57) ABSTRACT

A method of treating whey for demineralization purposes, the method comprising a stage of separating out salts by transfer through electrodialysis or nanofiltration membranes, wherein, upstream from this separation stage, the method comprises in succession at least one step of exchanging divalent cations for protons and at least one step of exchanging divalent anions for chloride ions.

7 Claims, 1 Drawing Sheet

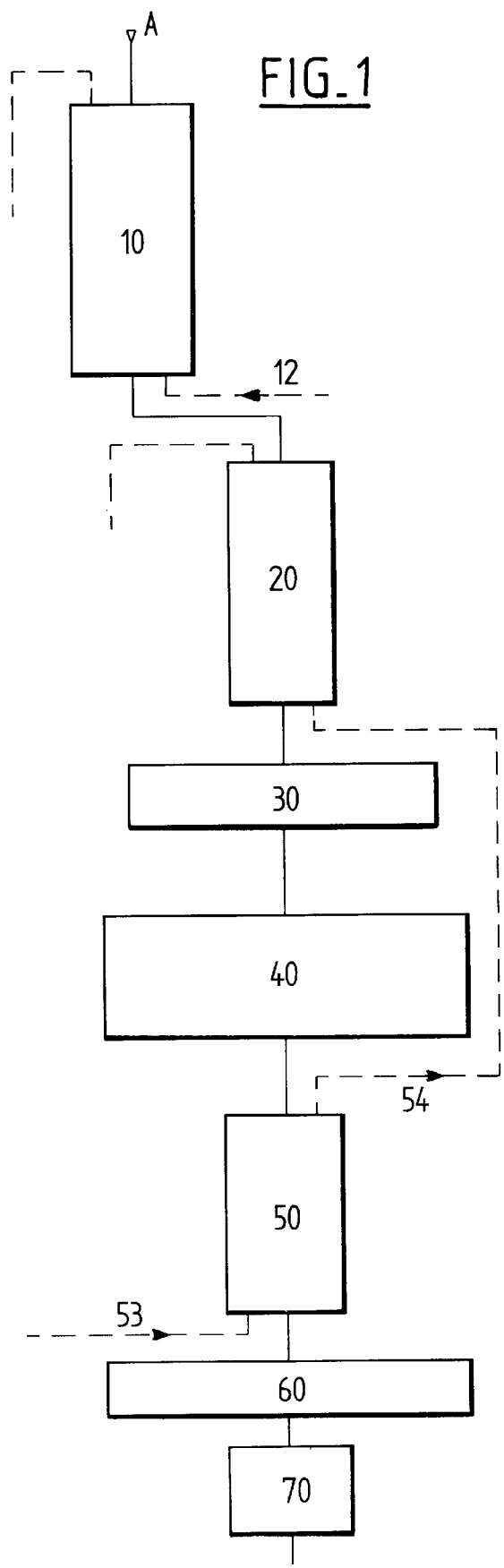
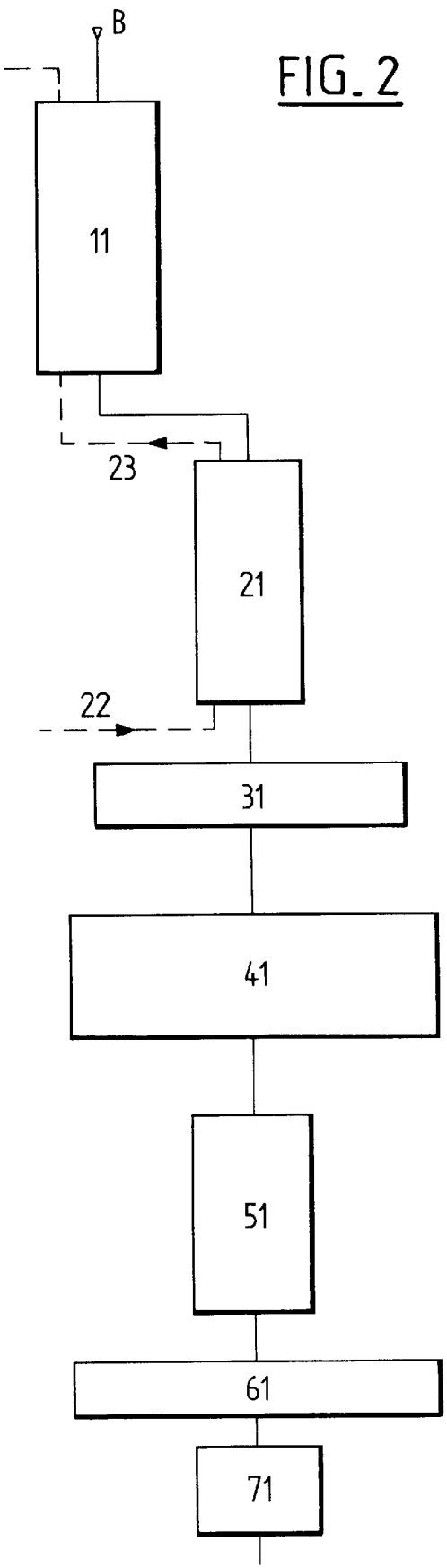

METHOD OF PROCESSING WHEY FOR DEMINERALIZATION PURPOSES

The present invention relates to demineralizing whey.

BACKGROUND OF THE INVENTION

Whey is a by-product of the milk and cheese industry, and it possesses great potential for development both concerning its lactose and concerning the serum proteins it contains.

Development is made difficult because of the presence of a large quantity of inorganic salts which firstly must be eliminated in order to make the final product suitable for consumption, and which secondly constitute factors that give rise to technical and economic constraints in the treatment of whey that are difficult to control.

Several methods are in existence for extracting from whey at least some of the inorganic salts it contains. Of these methods, mention can be made of ion exchange, electrodialysis, nanofiltration, . . . All of them have been operated on an industrial scale with greater or lesser success concerning the results obtained and above all concerning the cost of implementation, i.e. investment costs and running costs.

Attempts have also been made to associate them with one another in order to use them in series and take advantage of the maximum performance of each. It has found that the results obtained by one of them sometimes lead to a decrease in the performance of the following one, particularly since those techniques do not generally share the same know-how. For example, ion exchange and electrodialysis belong to two different technical fields which are not generally mastered by the same people.

OBJECTS AND SUMMARY OF THE INVENTION

The present invention stems from an observation concerning the behavior of whey with respect to membranes, whether for electrodialysis or belonging to apparatuses or units for nanofiltration. It has thus been discovered that the transfer of divalent ions (anions or cations) from whey occurs only with difficulty through such membranes, such that in order to obtain good results, economic conditions become prohibitive. It is thus possible at great expense to extract from whey some of the calcium or magnesium ions it contains; whatever the economic means implemented, it is very difficult to extract phosphate and citrate ions.

By means of the present invention, an optimum organization of various demineralization techniques is proposed in order to obtain highly demineralized whey at better cost and with minimum loss of the useable material while nevertheless maintaining the intrinsic quality thereof, in particular at microbiological level, by preserving it for example from lactose being degraded into lactic acid, proteins being degraded into non-protein nitrogen (NPN), . . . By means of this organization, the performance of separation apparatuses using membranes such as electrodialysis apparatuses or nanofiltration units is improved very substantially, thereby making it possible to reduce the surface areas of the membranes required, and thus making it possible to reduce running costs, with the additional consequence of obtaining low manufacturing costs for the whey demineralization treatment, regardless of whether it is treated in the raw or unconcentrated state or in the concentrated state.

To this end, the invention provides a method of treating whey for demineralization purposes, the method comprising a stage of separating out salts by transfer through electrodialysis or nanofiltration membranes, the method being remarkable in that, upstream from this separation stage, it comprises in succession at least one step of exchanging divalent cations for protons and at least one step of exchanging divalent anions for chloride ions.

This exchange of divalent cations for protons and of anions for chloride ions presents multiple advantages concerning both subsequent treatment implementing separation membranes and also the quality of the product itself. For example, exchanging cations for protons diminishes the influence of unstable proteins that are often associated with divalent cations and that tend to precipitate onto the surfaces of membranes, thereby requiring production to be stopped frequently for cleaning purposes. For example, since the step of exchanging divalent ions with chloride ions relates essentially to sulfates, the substance is relieved of the drawbacks of such sulfates which are firstly poorly ionized and therefore difficult to transfer through the membranes of electrodialysis apparatus, and which secondly pollute such membranes to a great extent. For example, the substance coming from those two ion exchange steps is a substance whose pH is relatively low, and the acid pH of this whey is a factor which enables citrate ions and phosphate ions to be transferred through nanofiltration membranes. Such transfer is practically non-existent in the presence of whey that has not been acidified. This performance is of considerable importance since, of all salts, it is known that phosphate ions are the most difficult to eliminate.

It should also be observed that having a substance with highly acidic pH at the outlet from these ion exchange steps is advantageous concerning control over microbiological quality. This substance lends itself in most advantageous manner to pasteurization at around 90° C. to 100° C. for a period of one or more minutes, which pasteurization serves to eliminate those germs that are the most difficult to destroy, i.e. sporulated germs, but without spoiling the proteins.

In a particularly preferred implementation of the invention, the step of exchanging divalent ions for protons comprises percolating the substance over a column of weak cationic resin, also known as carboxylic resin. One of the advantages of such a resin lies in the regeneration means that it requires, as explained below.

The extraction of divalent cations is improved by subsequently causing the substance that comes from said first carboxylic resin column to percolate over a strong cationic resin. Once 60% to 65% of the calcium and magnesium divalent cations have already been exchanged for protons by percolation over the carboxylic resin, the remainder of these divalent cations are exchanged for protons by the strong cationic resin. The strong cationic resin also makes it possible to find pH equilibrium that is preferably less than 3 by exchanging protons for monovalent ions of potassium and sodium.

Finally, the substance is passed over a strong anionic resin, preferably in a column which has mixed beds both of strong cationic resin and of the above strong anionic resin so as to exchange divalent anions for chloride anions. It is observed that this exchange applies essentially to sulfate anions.

This treatment leads to results that are entirely similar regardless of whether or not the whey is concentrated. Naturally, the quantities of resin to be implemented are proportional to the quantities of salts to be treated.

If the whey that has percolated over the resins is a concentrated whey, then, in accordance with the invention, the substance after these ion exchange steps is applied to the inlet of electrodialysis apparatus. By acting on a concentrated substance, the quantity of electric charge per unit volume is much higher than that present in non-concentrated whey, which acts in favor of using electrodialysis apparatus whose operation is then optimized from the point of view of electrical conductivity. Since the substance is also practically free from divalent ions, its operation is also optimized concerning the transfer of ions through cationic and anionic membranes. It has been observed firstly that the electrodialysis apparatus used in this way requires far less maintenance and upkeep, and secondly that the lifetime of the membranes is very significantly increased by factors of practically 1 to 2.

For non-concentrated "soft" whey, i.e. whey in which the concentration of dry matter is about one-third that of a concentrated "soft" whey, demineralization is preferably continued by using a nanofiltration unit. Since the ion exchange steps have eliminated most of the drawbacks existing in conventional nanofiltration of whey, this treatment stage possesses a first advantage of further demineralizing the whey since transferring chloride anions presents no difficulty, and since the acidity of the medium is high, the transfer of citrate and phosphate ions that have not been exchanged in the preceding steps is greatly improved. It possesses a second advantage which is that of extracting a very large quantity of water from the substance thus leading to a demineralized whey having a high concentration of valuable substances such as lactose and serum proteins. In this case also, it has been found that the performance of the nanofiltration operation is simply not comparable with that normally encountered when applying this treatment to raw whey.

BRIEF DESCRIPTION OF THE DRAWING

Other characteristics and advantages of the invention appear from the following description of two implementations applying to demineralizing concentrated whey and to demineralizing raw (liquid) whey.

Reference is made to the accompanying drawing, in which:

FIG. 1 is a block diagram of an installation implementing the method of the invention for demineralizing concentrated whey; and FIG. 2 is a block diagram of an installation implementing the invention for demineralizing non-concentrated whey.

MORE DETAILED DESCRIPTION

The whey to be treated by the installation shown in FIG. 1 is whey that has been concentrated e.g. to about 22% dry matter content. This concentrated whey is introduced at A into a first ion exchange column 10 which is a weak cationic or carboxylic column. In this column, ion exchange takes place between divalent cations and protons at a rate of about 60% to 70% of the divalent cations, and between sodium and potassium monovalent cations for protons at a rate of about 5% to 15%. The substance coming from the column 10 penetrates into a column 20 which is a column possessing a mixture of two resins: a strong cationic resin and a strong anionic resin. This type of column is said to be a "mixed bed" column, as is well known. In this column, exchange occurs between any remaining calcium and magnesium divalent cations and protons, between sodium and potassium ions and protons, and finally between mainly sulfate anions and chloride anions. On leaving the column 20, the substance contains a large quantity of protons and is therefore strongly acidic (pH in the range 2 to 2.5).

It then penetrates into a pasteurization unit 30 which enables a high level of microbiological stability to be conferred thereon, which is advantageous for the subsequent stage of treatment which is electrodialysis at about 40° C. It has been found that in spite of this temperature, the pasteurized whey does not develop any harmful microbiological flora. In the electrodialysis apparatus 40, most of the chloride ions and most of the protons are removed from the whey. The performance of this electrodialysis apparatus is greatly improved compared with using it on concentrated whey that has not had divalent ions removed therefrom because the membranes do not become clogged and because it is not necessary to subject the electrodialysis apparatus to extreme operating conditions that lead to a reduction in the lifetime of its membranes.

On leaving the electrodialysis apparatus, the substance is subjected to further ion exchange on a strong anionic resin that serves this time to exchange citrate and phosphate ions for chlorides, i.e. divalent anions which could not be retained by the preceding resins because of the presence of sulfate ions and because they are in competition with said poorly ionized anions for the resins, and which also could not be extracted by the electrodialysis apparatus. In this resin, the phosphate and citrate divalent anions are no longer in competition with more unstable anions so the resin can substitute them more easily. The substance can then be subjected to a second stage of finishing electrodialysis in electrodialysis apparatus 60 and can finally pass over an anionic resin 70 that has been regenerated with caustic soda in order to normalize the substance.

It is advantageous to observe that this installation lends itself to economic regeneration of the resins. The anionic column 50 is regenerated using hydrochloric acid 53 and the regeneration effluent 54 is taken to the mixed bed column 70 to regenerate it firstly with protons concerning the strong cationic resin and secondly with chloride ions concerning the strong anionic resin. The head carboxylic resin 10 is then regenerated using hydrochloric acid 12. Since this resin is relatively easy to regenerate (it recovers given practical capacity when using a quantity of regenerating substance that represents about 135% of said capacity), the consumption of "new" regenerating substance is optimized.

In FIG. 2, components 11, 21, and 31 are equivalent to components 10, 20, and 30 in the installation of FIG. 1, i.e. respectively one or more carboxylic resin columns 11, one or more mixed bed columns of strong cationic and strong anionic resins 21, and a pasteurization unit 31. Unconcentrated soft whey is inserted at B into this installation at the head of the carboxylic resin 11, with the dry matter content of the whey being about 6%. The treatment of this whey is entirely similar to that already described with reference to FIG. 1 concerning the resins 11 and 21. The same applies to pasteurization.

In contrast, at the outlet from the pasteurization unit 31, the substance is applied to a nanofiltration unit 41 instead of two electrodialysis apparatus. A nanofiltration unit provides much better demineralization performance than an electrodialysis apparatus since the quantity of charge per unit volume in non-concentrated whey is relatively low, thereby constituting a factor which puts a limit on conductivity in electrodialysis apparatus. In addition, since the final objective is to obtain a substance from which the water has been removed, i.e. either a powder or a substance that is highly concentrated, particularly in lactose, advantage is taken of the capacity for extracting water that is provided by nanofiltration which, in this case, advantageously compensates the prior operation of extracting water that needs to be performed in order to obtain the concentrated whey as treated by the installation of FIG. 1.

As explained above, the operation of the nanofiltration unit is optimized since most of the ions passing through its membrane are either monovalent anions or else protons, and since the substance is highly acid (pH 2 to 2.5), a very large transfer of citrate ions and of phosphate ions is also observed. In particular, nanofiltration makes it possible to extract about 70% of the phosphate and citrate ions where previously only insignificant extraction was observed.

As in the installation of FIG. 1, the substance can be improved by percolating over an anionic resin column regenerated with chloride ions 51, through electrodialysis apparatus 61, and finally over an anionic resin column regenerated with caustic soda in order to normalize the pH.

Concerning the re-generation of the resins, and in particular the resins of the columns 11 and 21, the column 21 is regenerated using hydrochloric acid 22 and the effluent 23 of this regeneration is used for regenerating the carboxylic resin 11, given that this carboxylic resin is fully satisfied with the residual charge in the effluent from regenerating the mixed bed column.

What is claimed is:

1. A method of demineralizing whey wherein the method comprises in succession at least one step of exchanging divalent cations for protons and at least one step of exchanging divalent anions for chloride ions, said exchanging steps being followed by a stage of separating out salts by transfer through electrodialysis or nanofiltration membranes.

2. A method according to claim 1, wherein the step of exchanging divalent ions for protons comprises percolating the substance over a column of weak cationic resin.

3. A method according to claim 2, wherein the step of exchanging divalent anions for chloride anions comprises, downstream from the weak cationic resin, a step of percolating the substance over a column of strong anionic resin.

4. A method according to claim 3, wherein the step of exchanging divalent anions for chloride anions downstream from the weak cationic resin is simultaneous with additional exchange of mono- and divalent anions for protons by percolating the substance over a strong cationic resin, said resin being disposed in at least one mixed bed column with the strong anionic resin.

5. A method according to claim 1, wherein, for unconcentrated raw whey to be treated, the above membranes belong to a nanofiltration unit.

6. A method according to claim 1, wherein, for concentrated whey to be treated, the above membranes belong to an electrodialysis unit.

7. A method according to claim 1, wherein, between the ion exchange steps and the membrane separation steps, the substance is subjected to a stage of pasteurization at a pH lying in the range 2 to 3.

* * * * *